United States Patent [19]

Hansen et al.

[11] 4,143,307

[45] Mar. 6, 1979

[54] MOTOR SPEED CONTROL CIRCUIT APPARATUS

[76] Inventors: Russel W. Hansen, 5111 Severance Dr., San Jose, Calif. 95123; Hans H. Stellrecht, 924 Ferngrove Dr., San Jose, Calif. 95129

[21] Appl. No.: 818,002

[22] Filed: Jul. 22, 1977

[51] Int. Cl.² ............................................... H04Q 7/02

[52] U.S. Cl. ........................................ 318/16; 46/254; 244/190; 318/269

[58] Field of Search ................. 318/16, 375, 376, 377, 318/378, 139, 318, 314, 380, 269, 341; 244/190; 46/249, 254; 340/171 R; 343/225

[56] References Cited

U.S. PATENT DOCUMENTS

| | | | |
|---|---|---|---|
| 3,260,912 | 7/1966 | Gregory | 318/341 |
| 3,548,271 | 12/1970 | Kampfer | 318/16 |
| 3,957,230 | 5/1976 | Boucher et al. | 46/244 |

*Primary Examiner*—David Smith, Jr.
*Attorney, Agent, or Firm*—Schatzel & Hamrick

[57] ABSTRACT

A pulse width modulated DC motor speed control circuit for models including a demodulator for receiving an input pulse having a width which may vary from a reference width, and for generating a first positive output pulse having a width proportional to the variation when the width of the input pulse is less than the reference width and for generating a second positive output pulsehaving a width proportional to the variation when the width of the input pulse exceeds the reference width, and a braking circuit for receiving the first output pulse and in response thereto causing any back EMF generated by the motor to be shorted for the duration of the output pulse, and a driving circuit for receiving the second output pulse and in response thereto connecting a source of power across the motor for the duration of the output pulse.

20 Claims, 4 Drawing Figures

MOTOR SPEED CONTROL CIRCUIT APPARATUS

BACKGROUND OF THE INVENTION

1. Field of the Invention

The present invention relates generally to remote control devices and more particularly to a remotely controlled motor speed control circuit for use in remotely controlled model vehicles.

2. Description of the Prior Art

The remote control of model cars, boats and airplanes is typically accomplished by the use of a radio control system such as the one shown diagrammatically in FIG. 1. The system includes a plurality of user adjustable controls, or joysticks, 10 which are adjustable over a range of positions in one or two planes and correspond to the desired setting of one or more control parameters in the model, e.g., the position of the rudder, ailerons and/or engine throttle.

An encoder 12 in the base unit generates a series of pulses each having an average width of 1½ milliseconds and a basic frame length of from 10 to 16 milliseconds. In response to the position of a given joystick, assigned pulses within the series are caused to vary over a range of from 1 to 2 milliseconds in width. The pulses generated by the encoder are then used to modulate a radio transmitter 14 having a carrier frequency which is usually within one of the three bands of frequencies located near 27, 50 and 72 megahertz.

The transmitted signal is received by a radio receiver 16 located within the model. The receiver detects the transmitted signal, recovering the continuous series of pulses which are then used to drive a decoder 18 which multiplexes the pulses, assigning a particular pulse of the series to a corresponding one of several control servos 20. In response to the width of its assigned pulse each servo drives one of the controls of the model connected thereto.

A model typically includes one or more DC motors, such as the motor 22, to provide power to be used, for example, in driving the model. The speed of the motor is controlled by a motor speed control 24 in response to the width of an assigned pulse from decoder 18.

It will be appreciated that the remote radio control of models presents some unique problems due in part to the great premium on space, and usually weight. Such restrictions severely limit the quantity of batteries which the model can carry. Since the principal source of power consumption within the model is usually the DC motors, their efficiency significantly affects the performance of the model. The small DC motors also present unusual problems due to their series resistance which varies from a very low value when the motor is stopped, or running slowly, to a much higher value at full speed. The low starting resistance of the motor results in a very high starting current which contributes greatly to the limited starting torque available.

Heretofore, control of the speed of DC motors used in models has primarily been accomplished by the use of servos, similar to those used to drive the other controls, which servos are used to drive rheostats or operate switches which vary the resistance in series with the motor. Not only is the use of series resistance to control motor speed very wasteful of the limited power available, but it aggravates the poor response inherent in such small motors. The series resistance also limits the starting current, resulting in poor low speed control, especially under varying load conditions.

One prior art device for electronically controlling the speed of a DC motor is described in the April 1976 issue of the magazine *Radio Controlled Modeler* at pages 6 and 66. This device includes a pulse width demodulator for receiving input control pulses. When a particular input pulse exceeds a reference width, the demodulator generates an output pulse having a width proportional to the excess width. The output is then fed through a Darlington circuit to control the motor speed. Although effective in generating a high motor starting current, the device is inefficient in controlling the motor at moderate and high speeds because of the large voltage loss occurring across the saturated Darlington transistors.

An electronic bidirectional device for controlling the speed of a DC motor is disclosed in the May 1976 issue of *Radio Controlled Modeler* at pages 12, 147–148, 151 and 154. This device uses a similar pulse width demodulator for generating first and second output pulses when the input pulse has a width greater than or less than the reference. The two output pulses are used to drive two inputs of a bridge type motor driving circuit. This device suffers from the disadvantage of requiring two separate batteries, i.e., one for powering the demodulator and another for powering the motor drive circuit so as to isolate the high current inductive load from the demodulator.

SUMMARY OF THE PRESENT INVENTION

It is therefore an important object of the present invention to provide a DC motor speed control capable of supplying high starting currents.

Another object of the present invention is to provide a highly efficient motor speed control.

An additional object is to provide a speed control having improved proportional control.

Briefly, the preferred embodiment includes a demodulator for receiving an input pulse having a width which may vary from a reference width, and for generating a first positive output pulse having a width proportional to the variation when the width of the input pulse is less than the reference width and for generating a second positive output pulse having a width proportional to the variation when the width of the input pulse exceeds the reference width. The preferred embodiment also includes a braking circuit responsive to the first output pulse for shorting any back EMF being generated by the motor during the pulse, and a driving circuit responsive to the second output pulse for connecting a source of power across the motor during the pulse.

The efficient utilization of power is thus a material advantage of the present invention.

Another advantage of the present invention is the fast response time of the controlled motor.

Still another advantage is the improved reliability of the present invention.

These and other objects and advantages of the present invention will no doubt become apparent after a reading of the following detailed description of the preferred embodiment illustrated in the several figures of the drawing.

IN THE DRAWING

DETAILED DESCRIPTION OF THE PREFERRED EMBODIMENT

Figure 1:
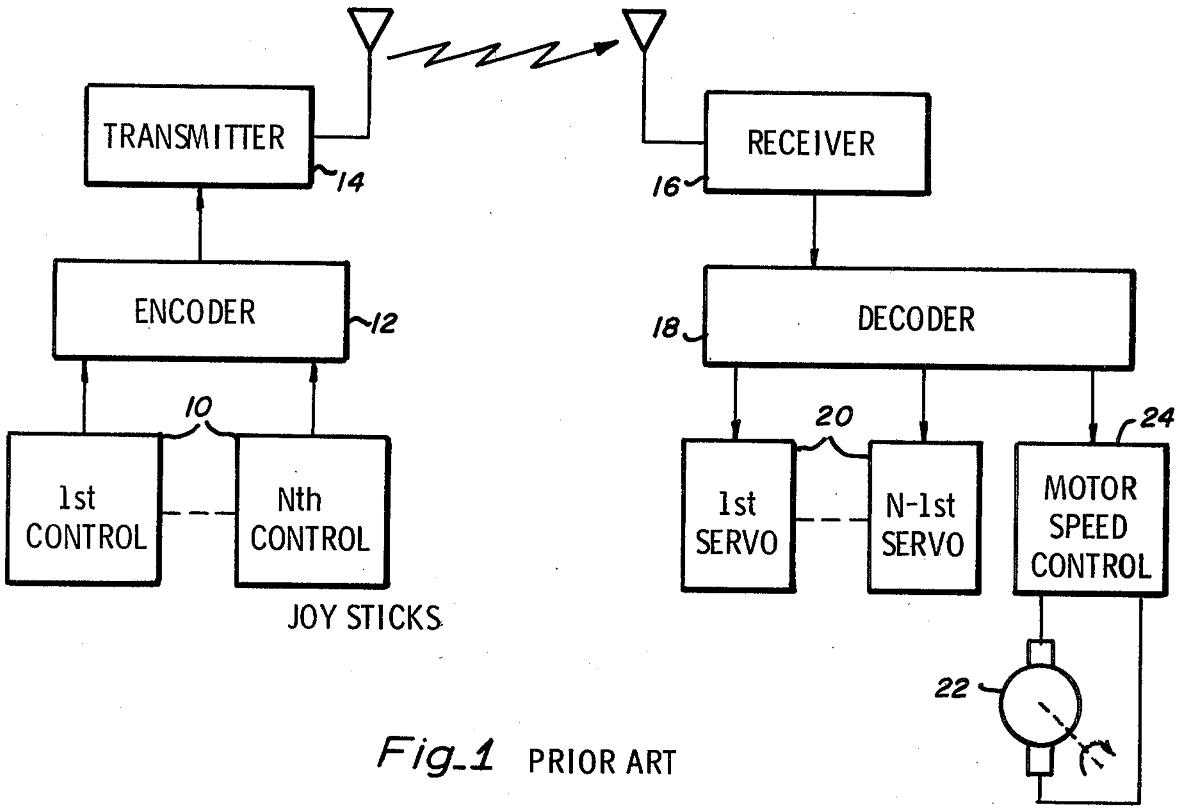
Fig 1 PRIOR ART
FIG. 1 is a block diagram generally illustrating the principal components of a remote radio control system.
Figure 2:
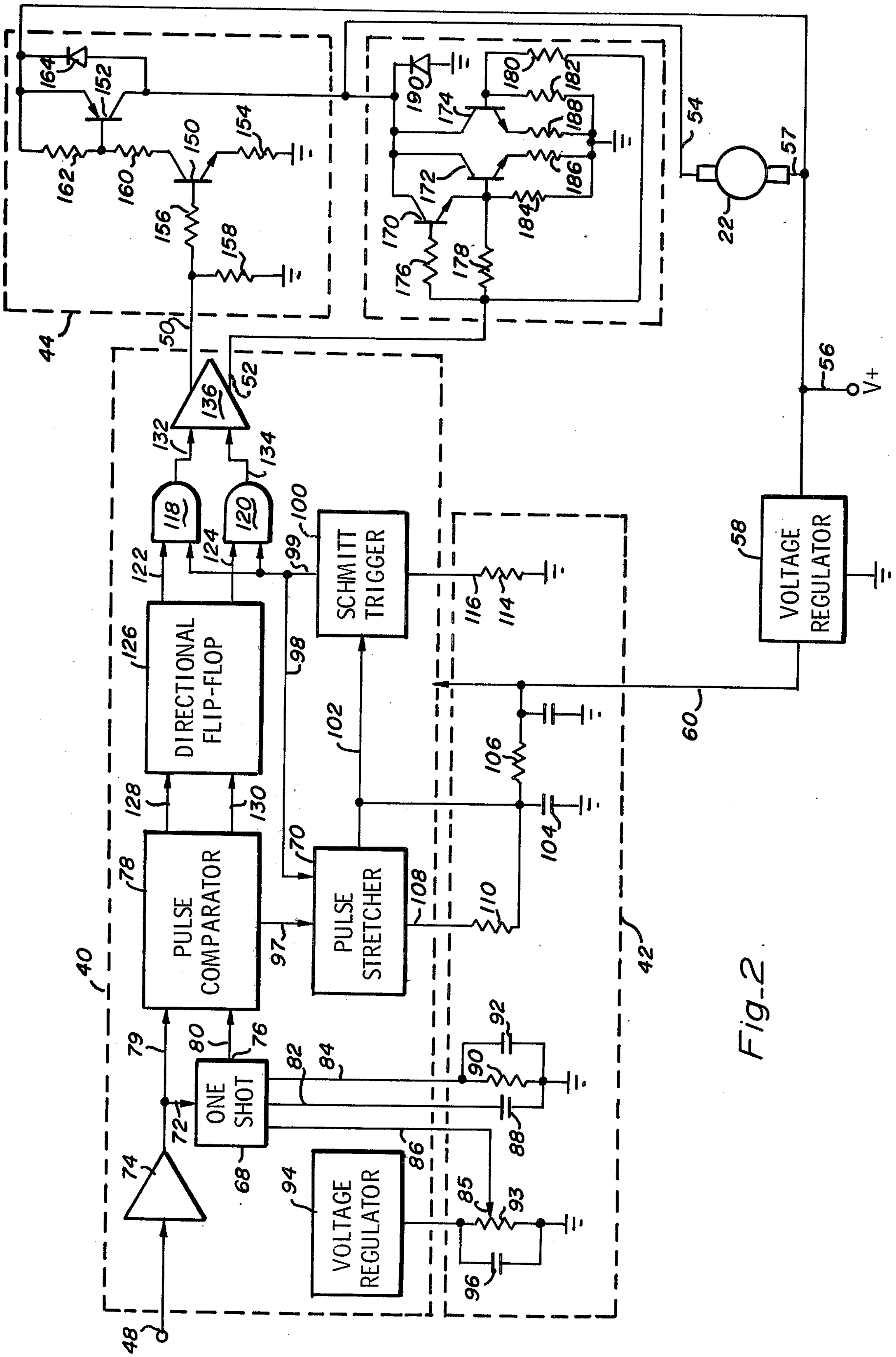
FIG. 2 is a schematic diagram generally illustrating a preferred embodiment of a DC motor speed control device in accordance with the present invention.

A preferred embodiment of an improved motor speed control device in accordance with the present invention is shown in FIG. 2 to generally include a pulse width demodulator 40 with its control associated circuitry 42, a dynamic motor braking circuit 44 and a dynamic motor driving circuit 46. The input to the device is a series of pulses developed by a decoder as discussed previously relative to FIG. 1 and input on an input line 48 having a width of from 1 to 2 milliseconds and a spacing from 10 to 16 milliseconds.

Generally stated, in response to variations in the width of the input pulses, demodulator 40 generates a series of output pulses on a first output line 50 or a series of complementary output pulses on a second output line 52. When an input pulse exceds a nominal width of 1½ milliseconds, demodulator 40 generates a pulse on line 50 which is positive with respect to a ground reference level. On the other hand, when the input pulse is of width less than the nominal, the demodulator generates a positive pulse on line 50. The width of each output pulse is proportional to the variation of the associated input pulse from the nominal. In the preferred embodiment, demodulator 40 is a commercially available pulse width demodulator, or servo amplifier, known as an NE 544 which is manufactured by Signetics Corporation of Sunnyvale, California. However, other integrated circuits or descrete transistors can also be used.

For the duration of each positive-going pulse generated on line 50 the dynamic braking circuit 44 effectively connects one side 54 of motor 22 to a positive power supply line 56, which is also connected to the other side 57 of the motor, thereby short circuiting any back EMF being generated by the motor and thus providing the desired braking action.

In response to the positive-going pulses generated on line 52, the dynamic motor drive circuit 46 effectively connects output line 54 to circuit ground, thus connecting the positive power supply potential across the motor for the duration of the pulse thereby energizing the motor.

A voltage regulator 58 is used to reduce the supply voltage present on line 56 to a regulated 5-volt level and to isolate the sensitive demodulator circuitry from the high power motor drive circuit and the inductive motor which generates large voltage and current spikes. The regulator thus eliminates the need for a second battery and permits operation over a broad range of battery voltages. In the preferred embodiment, the regulator 58 is a commercially available voltage regulating device such as that designate ua 7805.

The principal active components of pulse width demodulator 40 include a one-shot, or monostable, multivibrator 68, and a pulse stretcher 70. The input 72 to one-shot 68 is coupled to the demodulator input terminal 48 by a Buffer amplifier 74. The output 80 of one-shot 68 is connected to one input of a pulse comparator 78. A control line 82 is connected to circuit ground through a time constant capacitor 88, and a second line 84 is connected to circuit ground through a current programming resistor 90 which is bypassed by a capacitor 92. A potentiometer 93, connected between a reference voltage source 94 and circuit ground, develops a comparison voltage at its wiper contact 85 which is connected to line 86. The potentiometer is bypassed by a capacitor 96.

In response to an input pulse, the one-shot causes the level on line 80 to go high and generates a constant current signal on line 82 which is inversely proportional to the value of programming resistor 90. The constant current on line 82 charges capacitor 88 in a linear fashion until the voltage on the capacitor exceeds the reference potential on line 86. At this time the one-shot returns the signal level geing generated on output line 80 to the low level and discharges the capacitor 88.

In the preferred embodiment an amplifier input pulse on line 72 causes one-shot 68 to generate a 1½ millisecond reference pulse on line 80. Capacitors 92 and 96, connected across resistor 90 and potentiometer 93, respectively, stabilize the circuit and bypass noise signals thereacross.

Pulse stretcher 70 has a first input which is connected by a line 97 to an output of pulse comparator 78 for receiving a signal generated by the comparator when the input pulse on line 79 does not correlate with the reference pulse on line 80. A second input to the pulse stretcher is provided by a line 98 to the output of a Schmitt trigger 100, and the output of pulse stretcher is connected by a line 102 to the input of the Schmitt trigger. The stretcher output is also coupled through a timing capacitor 104 to circuit ground and through a gainsetting resistor 106 to the power supply line 60. Alternatively, resistor 106 may be connected to the output of the reference voltage source 94. The pulse stretcher also has a control line 108 connected through a resistor 110 to capacitor 104. Schmitt trigger 100 has a hysteresis characteristic which is set by a gain setting resistor 114 connected between a control line 116 and a circuit ground.

Upon receipt of a pulse generator on line 97, such pulse exceeding a preset dead time, pulse stretcher 70 and Schmitt trigger 100 cooperate to develop a timing pulse on line 99 having a width proportional to the width of the pulse. In the absence of a pulse on line 97, resistor 106 charges capacitor 104 to the potential on line 60 (or the reference voltage). During a short pulse, of width less than the perset dead time, pulse stretcher 70 causes capacitor 104 to partially discharge through resistor 110. Following the end of the pulse, the capacitor is recharged by current flowing through resistor 106.

However, should the width of the pulse exceed the dead time, capacitor 104 will discharge to a potential sufficiently low to trigger Schmitt trigger 100 and thereby cause line 98 to go high. The pulse stretcher then substitutes a constant current discharge path via line 108 and resistor 110 to further discharge the capacitor during the existence of the input pulse. Following termination of the pulse, the capacitor is permitted to be recharged by current flowing through resistor 106 toward the potential on line 60. When the potential across the capacitor exceeds a second, higher level, the Schmitt trigger causes line 98 to again go low. Thus, for each demodulator input pulse which varies from the nominal width in excess of a preset dead time, pulse stretcher 70 will generate a timing pulse having a width proportional to the variation.

The timing pulse generated on line 99 is gated into an amplifier 136 by a pair of AND gates 118 and 120 which are controlled by a steering signal generated on one of two lines 122 or 124 by a directional flip-flop 126 in response to an output developed by a pulse comparator 78. Comparator 78 generates a pulse on one or the other of the two lines 128 or 130 depending upon whether the width of the reference pulse one line 80 exceeds that of the inut pulse on line 72 or vice versa. The comparator output pulse sets flip-flop 126 causing either line 122 or 124 to go high until reset by another pulse from the comparator. Depending upon which steering pulse is developed by flip-flop 126, a gated pulse of duration equal to that of the timing pulse is developed on either line 132 or line 134. The gated pulse is then amplified by amplifier 136 to provide complementary pulses on lines 50 and 52.

The dynamic braking circuit 44 is shown to include two transistors 150 and 152. NPN transistor 150 has an emitter which is connected through an emitter biasing resistor 154 to circuit ground, and a base which is connected through a base drive resistor 156 and line 50 to the output of the demodulator which is also connected to circuit ground through the pull-down resistor 158. The collector of transistor 150 is connected by way of resistor 160 to the base of PNP transistor 152, which is also connected through a pull-up resistor 162 to its emitter and the positive supply line 56. The collector of transistor 152 is connected to motor 22 by way of line 54. A diode 164 is connected across the emitter and collector of transistor 154 to protect the transistor from transients generated by motor 22.

When line 50 is caused to go high, a first current having an amplitude determined by resistor 154, a resistor 156 and the gain of transistor 150 is caused to flow in the base of transistor 150. This first current causes an amplified second current to flow from the base of transistor 152 into the collector of transistor 150. The second current saturates transistor 152 to short any back EMF being generated by motor 22 for the duration of the input pulse. Resistor 158 hastens the turn-off of transistor 150 following the input pulse, and resistor 162 provides a path for leakage current flowing in the collector circuit of transistor 150, aiding the turn-off of transistor 152 following the pulse. Resistor 160 provides a voltage offset between the collector of transistor 150 and the base of transistor 152 and limits the maximum current which can flow from the base of transistor 152.

Dynamic motor driven circuit 46 includes three NPN transistors, two of which, i.e., transistors 170 and 172, are connected in a Darlington configuration, with the third transistor 174 being connected in parallel therewith. The bases of all three transistors are driven, each through one of three base drive resistors 176, 178 and 180, by a positive pulse generated on line 52. Transistor 174 has a resistor 182 connected from its base to circuit ground to speed up its turn-off. A similar resistor 184, connected between the base of transistor 172 and circuit ground, and a resistor 178 speed up the turn-off of transistor 172 and provide a path for leakage current flowing in the emitter circuit of transistor 170. Two small resistors 186 and 188, connected between the emitters of transistors 172 and 174, respectively, equalize the currents flowing in the two transistors. (In the preferred embodiment resistors 186 and 188 are constructed using the traces of the printed circuit board on which the DC motor speed control device is constructed.) A diode 190, connected from line 54 to ground, provides a path for back EMF generated by motor 22.

A positive pulse on line 52 turns all three transistors on, effectively connecting line 54 to circuit ground to impose nearly the full supply voltage across motor 22 for the duration of the pulse. Should the motor be stopped or running slowly at this time, it will have a very low resistance and will require a very large starting current. The Darlington configuration of transistor 170 and 172 provides a high base current drive to transistor 172 which enables it to supply the high starting current required. However, once the motor is running at moderate speed, and thus requiring a lower drive current, the parallel combination of transistors 172 and 174 share the drive current to provide a reduced saturation voltage and thus, increase circuit efficiency.

Thus, the DC motor speed control device, by alternatively shorting the motor or applying power thereto on a pulsed basis in response to the width of a series of input pulses, provides proportional speed control over the motor.

Figure 3:
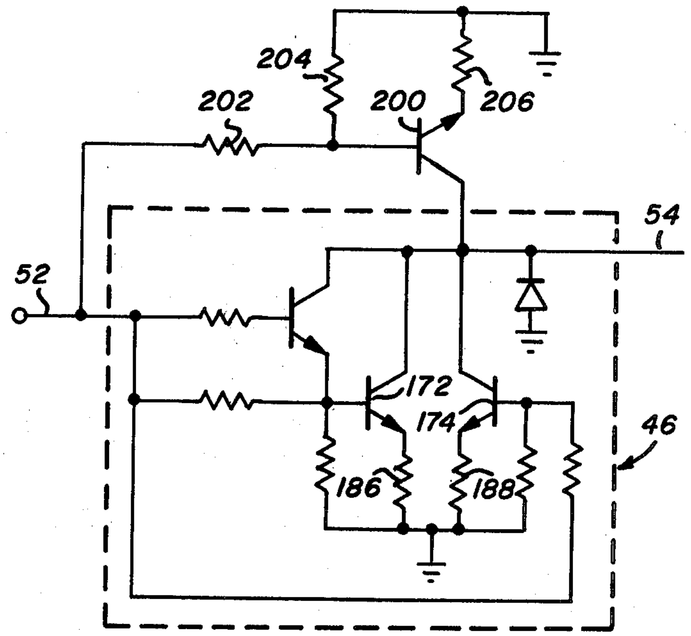
FIG. 3 is a schematic diagram of an alternative embodiment of a motor drive circuit for use in the DC motor speed control device shown in FIG. 2.

Referring now to FIG. 3, an alternative embodiment of a dynamic motor drive circuit is shown to include both the drive circuit 46 of FIG. 2 and an additional NPN transistor 200. The base of transistor 200 is connected through a base drive resistor 202 to line 52 and through a pull-down resistor 204 to circuit ground. The transistor has a collector which is connected to the motor by way of line 54 and an emitter connected to ground through a printed circuit current divider resistor 206.

A positive pulse developed on line 52 causes a base current, limited in part by resistor 202, to flow into the base of transistor 200 and drive it into saturation. Transistor 200 thus shares with transistors 172 and 174 the motor drive current in nearly equal proportions, the division being controlled by the emitter resistors 206, 186 and 188. The reduced current flow through each transistor reduces the total voltage drop across the transistors thereby further improving the circuit efficiency.

Figure 4:
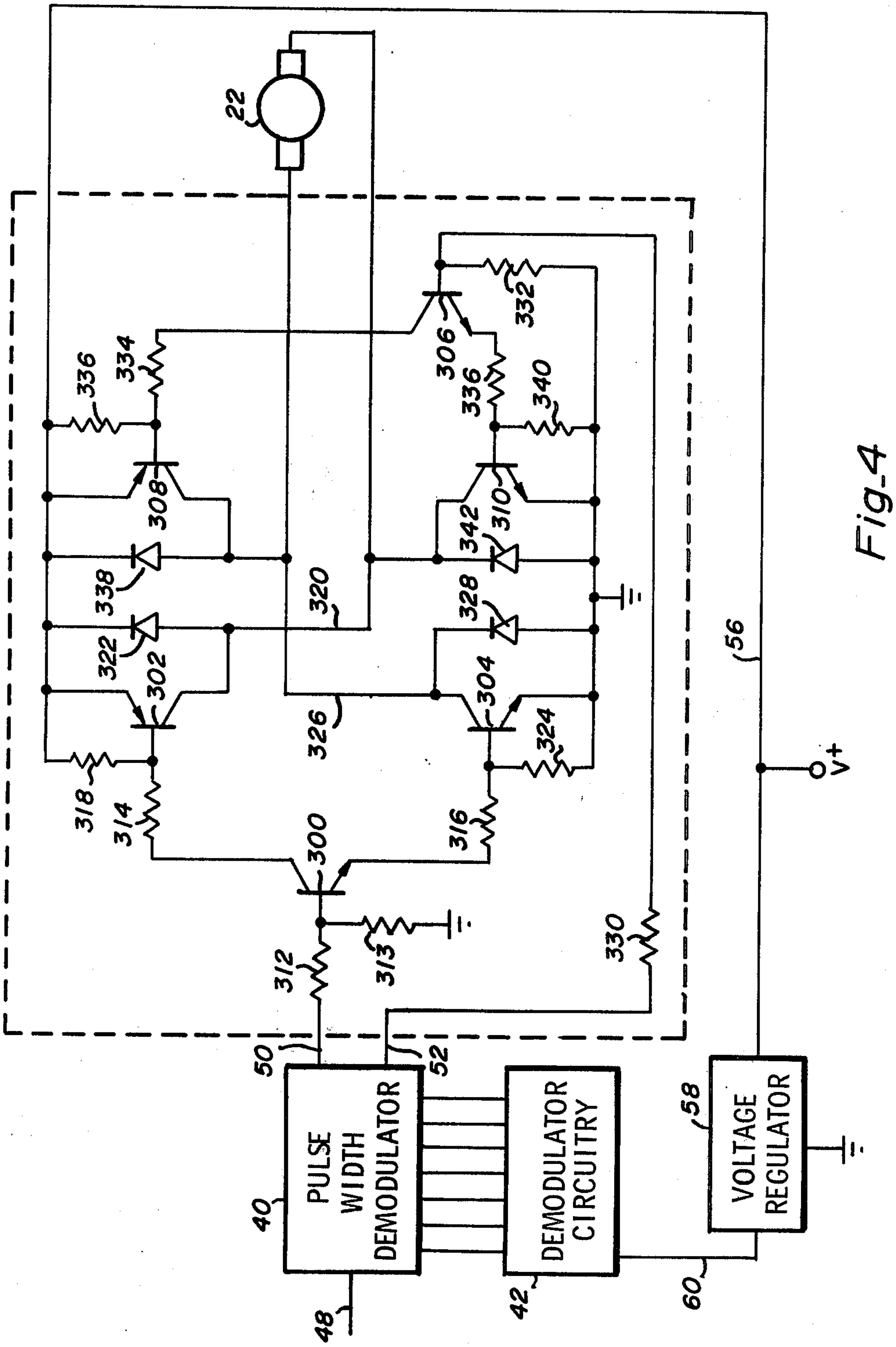
FIG. 4 is a schematic diagram of an alternative embodiment of a motor speed control device in accordance with the present invention.

FIG. 4 illustrates an embodiment of a bidirection motor speed control which includes pulse width demodulator 40 and its associated circuitry 42, voltage regulator 58 and six transistors, 300, 302, 304, 306, 308 and 310. In response to a pulse generated on line 48 which has a width greater than a reference width, demodulator 40 generates a pulse on line 50 having a width proportional to the excess, and when the pulse on line 48 is less than the reference it generates a pulse on line 54 having a width proportional to the difference, generates a pulse on line 52. Voltage regulator 58 regulates the supply voltage to demodulator 40 and its associated circuitry 42 and decouples them from the inductive motor and the high current drive circuit.

The base of NPN transistor 300 is connected to the input of demodulator 40 by line 50 and a base drive resistor 312, and to circuit ground through a pull-down resistor 313. Transistor 300 has a collector which is connected to the base of PNP transistor 302 through an offset resistor 314 and an emitter which is connected through a current limiting resistor 316 to the base of NPN transistor 304. The base of transistor 302 is connected through a base/pull-up resistor 318 to its emitter which is also connected to the positive supply line 56. The collector of transistor 302 is connected to one side of motor 22 by way of a line 320, and to its emitter by a motor back EMF routing diode 322. Transistor 304 has a base pull-down resistor 324 connected from its base to its emitter which is also connected to circuit ground. The collector of transistor 304 is connected to the other side of motor 22 by way of line 326, and to its emitter by a back EMF routing diode 328.

The base of transistor 306 is connected by way of a base drive resistor 330 to the second output developed by demodulator 40 on line 52 and is connected to circuit ground through a pull-down resistor 332. Transistor 306 has a collector which is connected to the base of PNP transistor 308 through an offset resistor 334, and an emitter which is connected through a current limiting resistor 336 to the base of the NPN transistor 310. Transistor 308 also includes a base pull-up resistor 338 connected between its base and its emitter and line 56. The collector of transistor 308 is connected to line 326 and its emitter by a back EMF routing diode 338. Transistor 310 has a base pull-down resistor 340 connected from its base to its emitter and circuit ground. The collector of 310 is connected to line 320 and circuit ground by way of a back EMF routing diode 342.

A positive pulse on line 50 causes a base current to flow into transistor 300 having magnitude which is determined in part by resistors 312 and 313. In response to the base current, an amplifier current is caused to flow from the base of transistor 302 through transistor 300 and into the base of transistor 304, driving both transistors 302 and 304 into saturation. This effectively connects via line 320, one side of the motor 22 to the positive power supply and connects, via line 326, the other side of the motor 22 to circuit ground while applying nearly the full power supply potential across the motor for the duration of the pulse. This causes the motor to run at a speed proportional to the duty cycle of the pulse developed on line 50.

At the trailing edge of a positive pulse developed on line 50, transistor 300 is turned off in part by the clamping action of resistor 314, and remains turned off until the occurrence of another positive pulse. The resistors 318 and 324 provide a path for leakage current in transistor 300 so as to maintain transistors 302 and 304 in the off state.

A positive pulse developed on line 52 causes a base current which is limited by resistors 330 and 336 to flow into transistor 306. The resultant amplified current flowing in the bases of transistors 308 and 310 causes these transistors to saturate, effectively connecting line 326 to the positive supply potential and line 320 to circuit ground. It will be noted that this again connects motor 22 directly across the supply potential, but, however, in a reverse direction so as to operate the motor in reverse.

Although the above discussion is with general reference to pulse width modulation, it is understood that other types of modulation, particularly pulse position modulation can also be employed. In fact, the time difference between the occurance of the timing pulse and the information pulse is also a pulse which has a width which varies in proportion to the relative position of the information pulse.

It is contemplated that after having read the preceding disclosure that other alterations and modifications of the present invention will no doubt become apparent to those skilled in the art, it is therefore intended that the following claims be interpreted as covering all such alterations and modifications as fall within the true spirit and scope of the invention.

What is claimed is:

1. A motor speed control circuit for controlling the operation of a DC motor in response to an input modulated control signal, comprising;

demodulator means responsive to the input control signal and operative to develop a first output signal including a series of pulses having widths proportional to any positive difference between the pulses of the input control signal and a series of corresponding reference pulses, and for developing a second output signal including a series of pulses having widths proportional to any negative difference between the pulses of the input control signal and said series of references pulses;

power supply means normally coupled to one side of the energizing windings of the DC motor to be controlled;

a circuit ground;

dynamic braking means responsive to said first output signal and operative to couple said power supply means to the other side of the energizing windings of the DC motor so as to short the back EMF of the motor and apply a braking force thereto; and mtor drive circuit means responsive to said second output signal and operative to couple the other side of the energizing windings of the motor to said circuit ground so as to cause said power supply to provide driving power to the energizing windings of the motor.

2. A motor speed control circuit as recited in claim 1, wherein said braking circuit includes a first electronic switching means having first electrode coupled to said demodulator means to receive said first output signal, a second electrode coupled to said power supply means, and a third electrode coupled to the other side of the energizing windings of the motor.

3. A motor speed control circuit as recited in claim 2, wherein said braking circuit further includes diode means connected between said second and third electrodes to protect said first switching means from transient currents developed by the DC motor.

4. A motor speed control circuit as recited in claim 1, wherein said motor drive circuit means includes a first subcircuit responsive to said second output signal and operative to provide a high starting current to the windings of the motor, and a second subcircuit responsive to said second output signal and operative to cooperate with said first subcircuit to provide means having a low saturation voltage for driving the motor.

5. A motor speed control circuit as recited in claim 2, wherein said second subcircuit includes a Darlington circuit coupled between said ground and said other side of the energizing windings.

6. A motor speed control circuit as recited in claim 5, wherein said second subcircuit further includes an electronic switching means including a first electrode coupled to said demodulator means to receive said second output signal, a second electrode coupled to said other side of the energizing windings of the DC motor, and a third electrode coupled to said circuit ground.

7. A motor speed control circuit as recited in claim 6, wherein said second subcircuit further includes diode means connected between said second and third electrodes to protect said electronic switching means from back EMF generated by the DC motor.

8. In a remote radio control receiver apparatus including means for receiving a modulated control signal and control means responsive to the received signal and operative to control a DC motor, an improved control means comprising;

demodulator means responsive to the control signal and operative to develop a first output signal including a series of pulses having widths proportional to a difference between the corresponding pulses of the input control signal and the widths of a series of corresponding reference pulses;

power supply means normally coupled to one side of the energizing windings of the DC motor to be controlled;

a circuit ground;

dynamic braking means responsive to said first output signal and operative to couple said power supply means to the other side of the energizing windings of the DC motor so as to short the back EMF of the motor and apply a braking force thereto.

9. In a remote radio control receiver apparatus as recited in claim 8, wherein said braking means includes a first electronic switching means having a first electrode coupled to said demodulator means to receive said first output signal, a second electrode coupled to said power supply means, and a third electrode coupled to the other side of the energizing windings of the DC motor.

10. In a remote radio control receiver apparatus as recited in claim 9, wherein said braking means further includes diode means connected between said second and third electrodes to protect said first switching means from transient current developed by the DC motor.

11. In a remote radio control receiver apparatus as recited in claim 8, wherein said demodulator means is further operative to develop a second output signal including a series of pulses having widths proportional to another difference between the widths of the corresponding pulses of said control signal and the widths of a series of corresponding reference pulses, and further comprising motor drive circuit means responsive to said second output signal and operative to couple the other side of the energizing windings of the motor to said circuit ground so as to cause said power supply to provide driving power to the energizing windings of the motor.

12. In a remote radio control receiver apparatus as recited in claim 11, wherein said motor drive circuit means includes a first subcircuit responsive to said second output signal and operative to provide a high starting current to the windings of the motor, and a second subcircuit responsive to said second output signal and operative to cooperate with said first subcircuit to provide means having a low saturation voltage for driving the motor.

13. In a remote radio control receiver apparatus as recited in claim 9, wherein said first subcircuit includes a Darlington circuit coupled between said ground and said other side of the energizing windings of the motor.

14. In a remote radio control receiver apparatus as recited in claim 13, wherein said second subcircuit includes an electronic switching element having a first electrode coupled to said demodulator means to receive said second output signal, a second electrode coupled to said other side of the energizing windings of the DC motor and a third electrode coupled to said circuit ground, the output stage of said Darlington circuit and said switching element being effectively connected in parallel with each other.

15. In a remote radio control receiver apparatus as recited in claim 14, wherein said second subcircuit further includes another electronic switching element having a fourth electrode coupled to said demodulator means to receive said second output signal, a fifth electrode coupled to said other side of the energizing windings of said motor, and a sixth electrode coupled to said circuit ground.

16. In a remote radio control receiver apparatus as recited in claim 14, wherein said second subcircuit includes diode means connected between said second and third electrodes to protect said electronic switching means from back EMF generated by the DC motor.

17. A motor speed control circuit for controlling the operation of a DC motor in response to an input pulse-width-modulated control signal, comprising;

pulse width demodulator means responsive to the input control signal and operative to develop a first output signal including a series of pulses having widths proportional to the difference between the widths of pulses of the input signal and the widths of the corresponding pulses of a series of reference pulses;

power supply means normally coupled to one side of the energizing windings of the DC motor to be controlled;

a circuit ground; and first motor drive circuit means responsive to said first output signal and operative to couple the other side of the energizing windings of the motor to said circuit grounds so that said power supply means applies driving power thereto.

18. A motor speed control circuit, as recited in claim 17, wherein said pulse width demodulator means is further operative to develop a second output signal including a series of pulses having widths proportional to another difference between the width of the corresponding pulses of said input control signal and said series of reference pulses; and further comprising second motor drive circuit means responsive to said second output signal and operative to couple said one side of the energizing windings of the motor to said circuit ground, and to couple said other side thereof to said power supply means so as to drive said motor means in a second direction.

19. A motor speed control circuit as recited in claim 18, wherein said first motor drive circuit means includes a first switching element having a first electrode for receiving said first output signal, a second electrode and a third electrode;

a second switching element having a fourth electrode coupled to said second electrode, a fifth electrode coupled to said power supply means and a sixth electrode coupled to said one side of the energizing windings of the motor; and a third switching element having a seventh electrode coupled to said third electrode, an eighth electrode coupled to said other side of the windings of the motor, and a ninth electrode coupled to said circuit ground, whereby the leading edge of each pulse forming a part of said first output signal causes said first switching element to conduct and cause said second switching element to connect said one side of said energizing windings to said power supply means and to cause said third switching element to connect said other side of said energizing windings to said circuit ground thereby causing said motor to be driven in a first direction.

20. A motor speed control circuit as recited in claim 19, wherein said second motor drive circuit means further includes a fourth switching element having a first electrode for receiving said second output signal, a second electrode and a third electrode;

a fifth switching element having a fourth electrode coupled to the second electrode of said fourth switching element, a fifth electrode coupled to said power supply means and a sixth electrode coupled to said other side of the energizing windings of the motor; and a sixth switching element having a seventh electrode coupled to the third electrode of said fourth switching element, an eighth electrode coupled to said one side of the windings of the motor, and a ninth electrode coupled to said circuit ground, whereby the leading edge of each pulse forming a part of said second outut signal causes said fourth switching element to conduct and cause said fifth switching element to connect said other side of said energizing windings to said power supply means and to cause said sixth switching element to connect said one side of said energizing windings to said circuit ground thereby causing said motor to be driven in a second direction.

* * * * *